United States Patent [19]
Ichida

[11] Patent Number: 6,135,906
[45] Date of Patent: Oct. 24, 2000

[54] GAS ACTUATING DEVICE WITH AN EXHAUST PASSAGE THAT PREVENTS CONTAMINATION OF AN ACTUATING MEMBER

[75] Inventor: Tadashi Ichida, Sakai, Japan

[73] Assignee: Shimano, Inc., Osaka, Japan

[21] Appl. No.: 09/267,138

[22] Filed: Mar. 11, 1999

[51] Int. Cl.[7] ............................... F16H 7/22; F15B 11/08
[52] U.S. Cl. ........................... 474/82; 474/104; 474/110; 91/433; 91/442
[58] Field of Search ..................................... 474/104, 110, 474/113, 80, 82; 91/433, 440, 442, 446; 280/238, 261

[56] References Cited

U.S. PATENT DOCUMENTS

| | | | |
|---|---|---|---|
| 2,640,368 | 6/1953 | Schjolin | 91/433 X |
| 3,742,777 | 7/1973 | Mathauser | 474/82 X |
| 4,352,503 | 10/1982 | Cotter | 280/238 |
| 4,938,324 | 7/1990 | Van Dyke | 474/80 X |
| 5,890,979 | 4/1999 | Wendler | 474/82 |

FOREIGN PATENT DOCUMENTS 120571  10/1984  European Pat. Off. .

OTHER PUBLICATIONS

U.S. application No. 08/846,265, "Gas Actuated Transmission For A Bicycle," filed Apr. 29, 1997.

*Primary Examiner*—Richard M. Lorence
*Attorney, Agent, or Firm*—James A. Deland

[57] ABSTRACT

A gas actuating device includes a housing having a gas applying chamber, an actuator chamber and a gas applying passage for communicating gas from the gas applying chamber to the actuator chamber. An actuating member having a first side and a second side is disposed in the actuator chamber, wherein the first side of the actuating member receives gas pressure from gas applied to the actuating chamber from the gas applying passage. The actuating member moves in a first direction in response to the gas pressure applied to the first side of the actuating member. A valve selectively communicates compressed gas from the gas applying chamber to the actuator chamber through the gas applying passage for moving the actuating member in the first direction, and a gas release passage communicates gas from the actuator chamber at the first side of the actuating member to an outside of the actuator chamber.

24 Claims, 15 Drawing Sheets

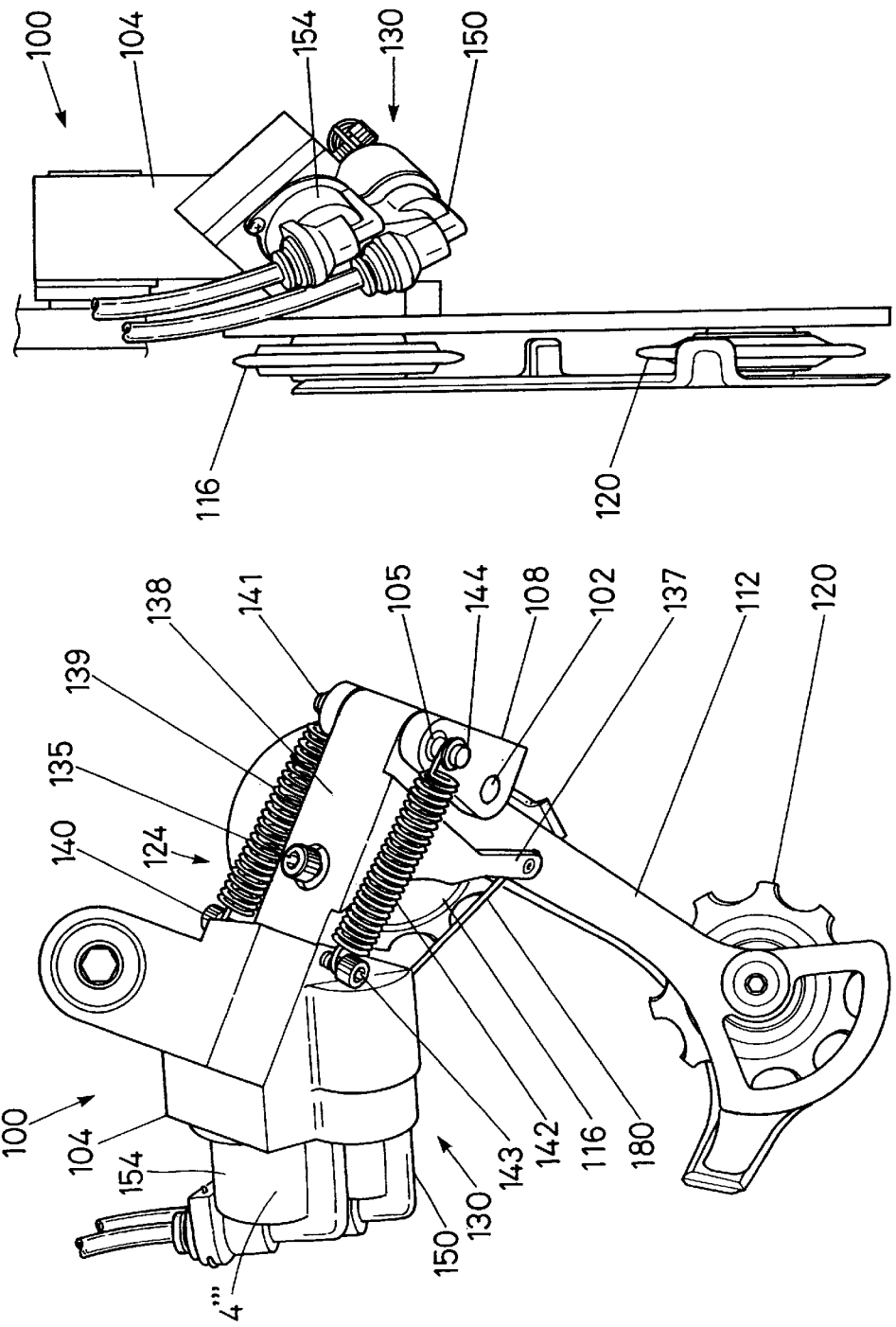

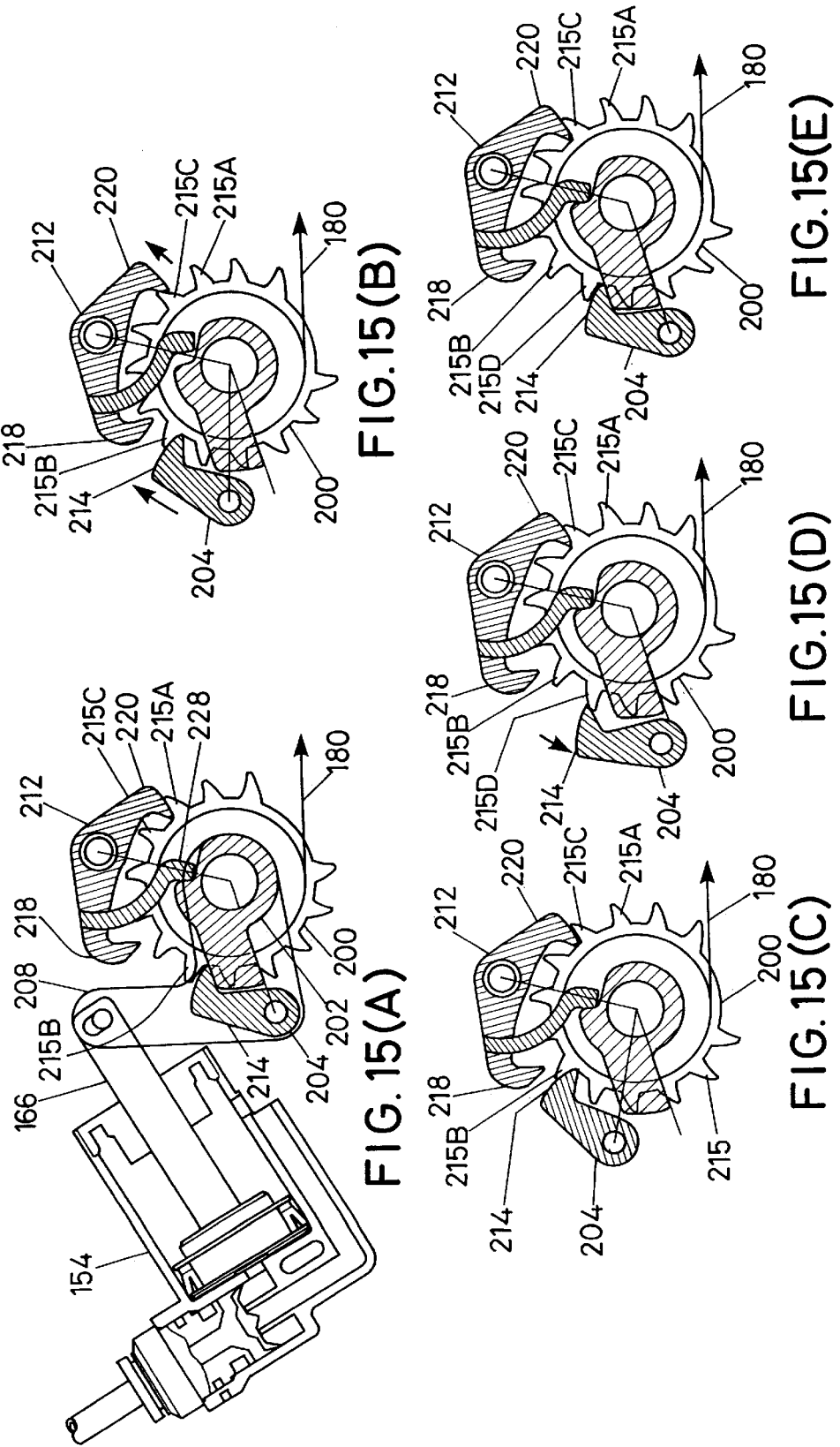

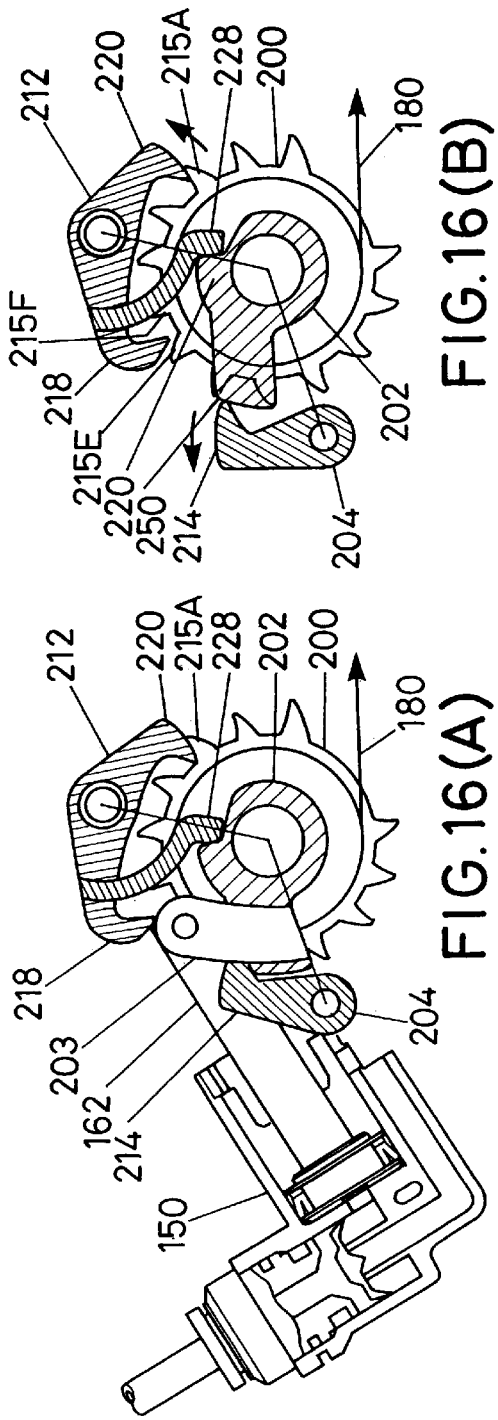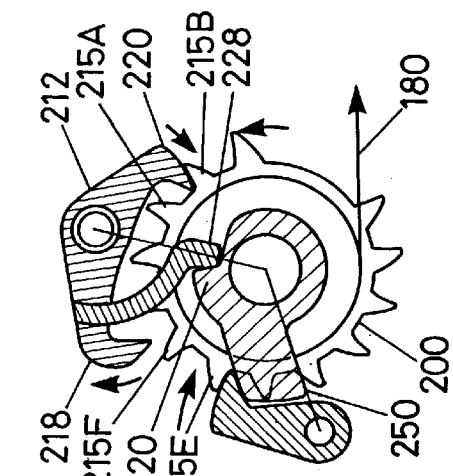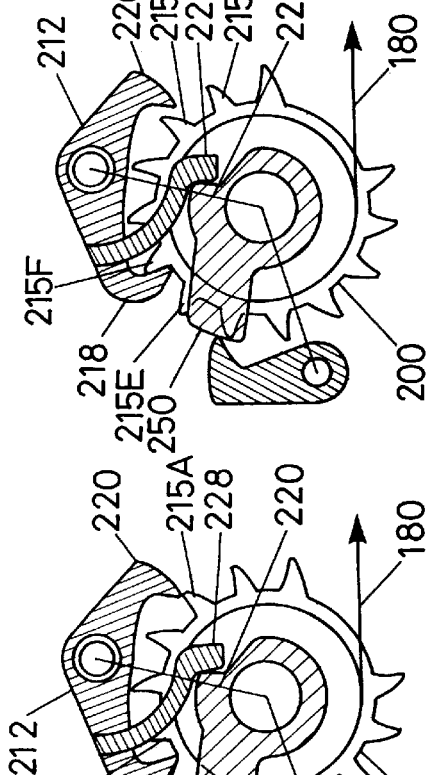

GAS ACTUATING DEVICE WITH AN EXHAUST PASSAGE THAT PREVENTS CONTAMINATION OF AN ACTUATING MEMBER

BACKGROUND OF THE INVENTION

The present invention is directed to gas actuated control devices and, more particularly, to a gas actuating device used for operating a bicycle transmission.

Gas actuated control devices are used for many purposes, and they take many different forms. A typical gas actuated control device includes an actuating member that actuates the device to be controlled and a valve that selectively applies gas pressure to the actuating member so that the actuating member reciprocates in some desired manner. In some applications, such as bicycle shift control devices, the actuating member must rapidly move in a precise manner. This requires rapid application of gas pressure as well as rapid removal of gas pressure. Also, it is necessary to ensure that the components are not subjected to contamination which could cause excessive friction and therefore result in slower movement of the actuating member.

SUMMARY OF THE INVENTION

The present invention is directed to a gas actuating device which provides rapid movement of an actuating member and which minimizes or prevents the entry of contaminants into the device. In one embodiment of the present invention, a gas actuating device includes a housing having a gas applying chamber, an actuator chamber and a gas applying passage for communicating gas from the gas applying chamber to the actuator chamber. An actuating member having a first side and a second side is disposed in the actuator chamber, wherein the first side of the actuating member receives gas pressure from gas applied to the actuating chamber from the gas applying passage. The actuating member moves in a first direction in response to the gas pressure applied to the first side of the actuating member. A valve selectively communicates compressed gas from the gas applying chamber to the actuator chamber through the gas applying passage for moving the actuating member in the first direction, and a gas release passage communicates gas from the actuator chamber at the first side of the actuating member to an outside of the actuator chamber.

In a more specific embodiment of the present invention, a gas actuating device includes a housing having a gas applying chamber, an actuator chamber and a gas applying passage for communicating gas from the gas applying chamber to the actuator chamber. An actuating member having a first side and a second side is disposed in the actuator chamber. The first side of the actuating member receives gas pressure from gas applied to the actuating chamber from the gas applying passage so that the actuating member moves in a first direction in response to the gas pressure applied to the first side of the actuating member. A valve selectively communicates compressed gas from the gas applying chamber to the actuator chamber through the gas applying passage for moving the actuating member in the first direction. The housing includes a gas release passage for communicating gas from the actuator chamber at the first side of the actuating member to the actuator chamber at the second side of the actuating member. Thus, when compressed gas is applied to the gas applying passage to move the actuating member in the first direction and then stopped, the gas returning from the actuator chamber at the first side of the actuating member is routed back to the actuator chamber at the second side of the actuating member to prevent contaminants from entering the housing.

In an even more specific embodiment, the housing further includes an ambient gas passage for communicating gas between the actuator chamber at the second side of the actuating member and the outside the housing. The returning gas applied to the actuator chamber at the second side of the actuating member prevents a vacuum from forming in the actuator chamber at the second side of the actuating member and, in fact, can cause a higher pressure in the actuator chamber which blows gas out the ambient gas passage to further prevent contaminants from entering the actuator chamber through the ambient gas passage.

BRIEF DESCRIPTION OF THE DRAWINGS

FIG. 10 is a side view of a gas actuated derailleur incorporating the gas actuating device shown in FIG. 9;

FIG. 11 is a rear view of a gas actuated derailleur shown in FIG. 10;

FIG. 15A is a partial cut away view showing the indexing mechanism components used in a downshifting operation;

FIGS. 15B–15E illustrate the operation of the indexing mechanism during a downshifting operation;

FIG. 16A is a partial cut away view showing the indexing mechanism components used in an upshifting operation; and FIGS. 16B–16E illustrate the operation of the indexing mechanism during an upshifting operation.

DETAILED DESCRIPTION OF THE EMBODIMENTS

Figure 1:
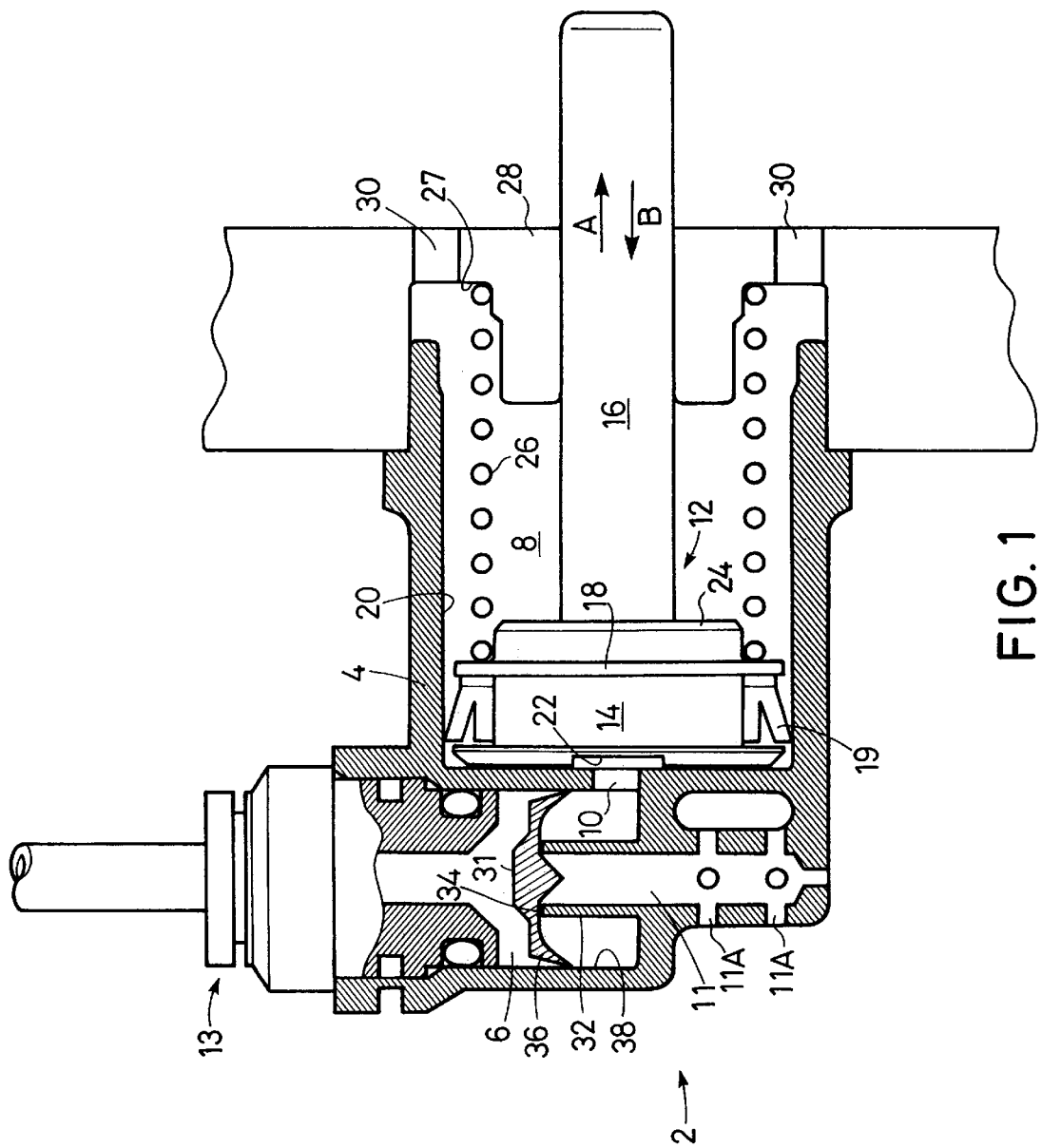
FIG. 1 is a cross-sectional view of a particular embodiment of a gas actuating device according to the present invention.

FIG. 1 is a cross-sectional diagram of a particular embodiment of a gas actuating device 2 according to the present invention. Gas actuating device 2 includes a housing 4 having a gas applying chamber 6, an actuator chamber 8, a gas applying passage 10 for communicating gas from the gas applying chamber 6 to the actuator chamber 8, and a gas release passage 11 with exhaust openings 11A for communicating gas from gas applying chamber 6 to the outside of housing 4 in the manner discussed below. Compressed gas is supplied to gas applying chamber 6 from a gas conduit 13 screwed into or otherwise sealingly attached to housing 4.

An actuating member 12 in the form of a piston 14 coupled to a reciprocating member 16 is disposed in the actuator chamber 8. A seal 18 having a sealing lip 19 is circumferentially disposed around piston 14 for sealingly engaging an inner peripheral surface 20 of actuator chamber 8. Piston 14 has a first side 22 and a second side 24, wherein first side 22 of piston 14 receives gas pressure from gas applied to the actuator chamber 8 from the gas applying passage 10. As a result, actuating member 12 moves in a first direction indicated by arrow A in response to gas pressure applied to the first side 22 of piston 14. A biasing mechanism in the form of a spring 26 is disposed between second side 24 of piston 14 and an internal abutment 27 formed on a side wall 28 for biasing actuating member 12 in a second direction indicated by arrow B, which in this embodiment is opposite the direction A. Side wall 28 has ambient gas passages 30 for communicating gas between the actuator chamber 8 at the second side 24 of piston 14 and the outside of housing 4.

A valve 31 is disposed within gas applying chamber 6 for selectively communicating compressed gas from the gas applying chamber 6 to the actuator chamber 8 through the gas applying passage 10. More specifically, gas release passage 11 includes a side wall 32 that extends into the gas applying chamber 6 and terminates in a gas release intake opening 34. Valve 31 ordinarily rests on the top of side wall 32. Valve 31 also includes an inclined sealing lip 36 that sealingly engages an inner peripheral side wall 38 of the gas applying chamber 6.

Figure 2:
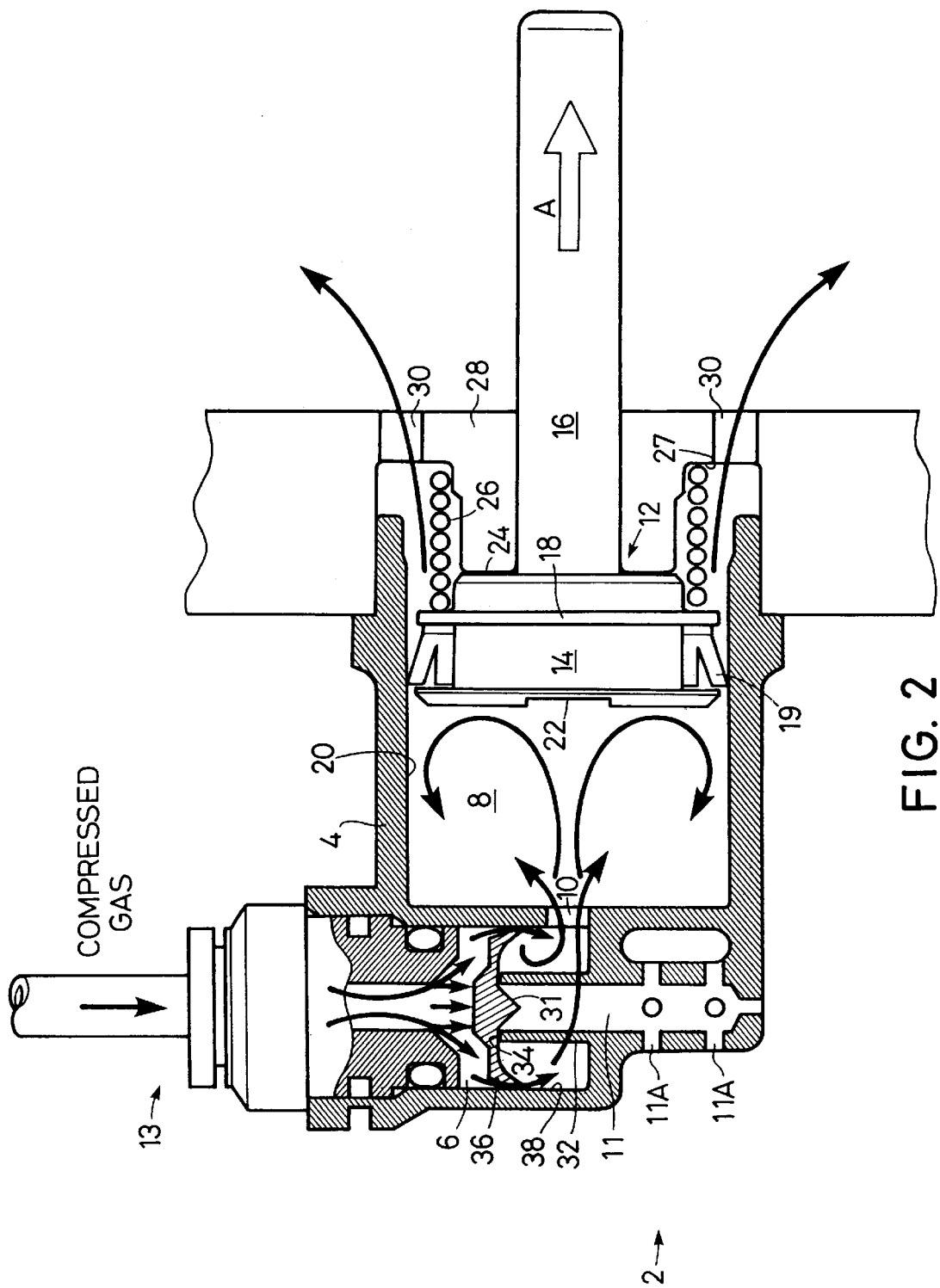
FIG. 2 is a cross-sectional view of the gas actuating device shown in FIG. 1 in an actuating mode.
Figure 3:
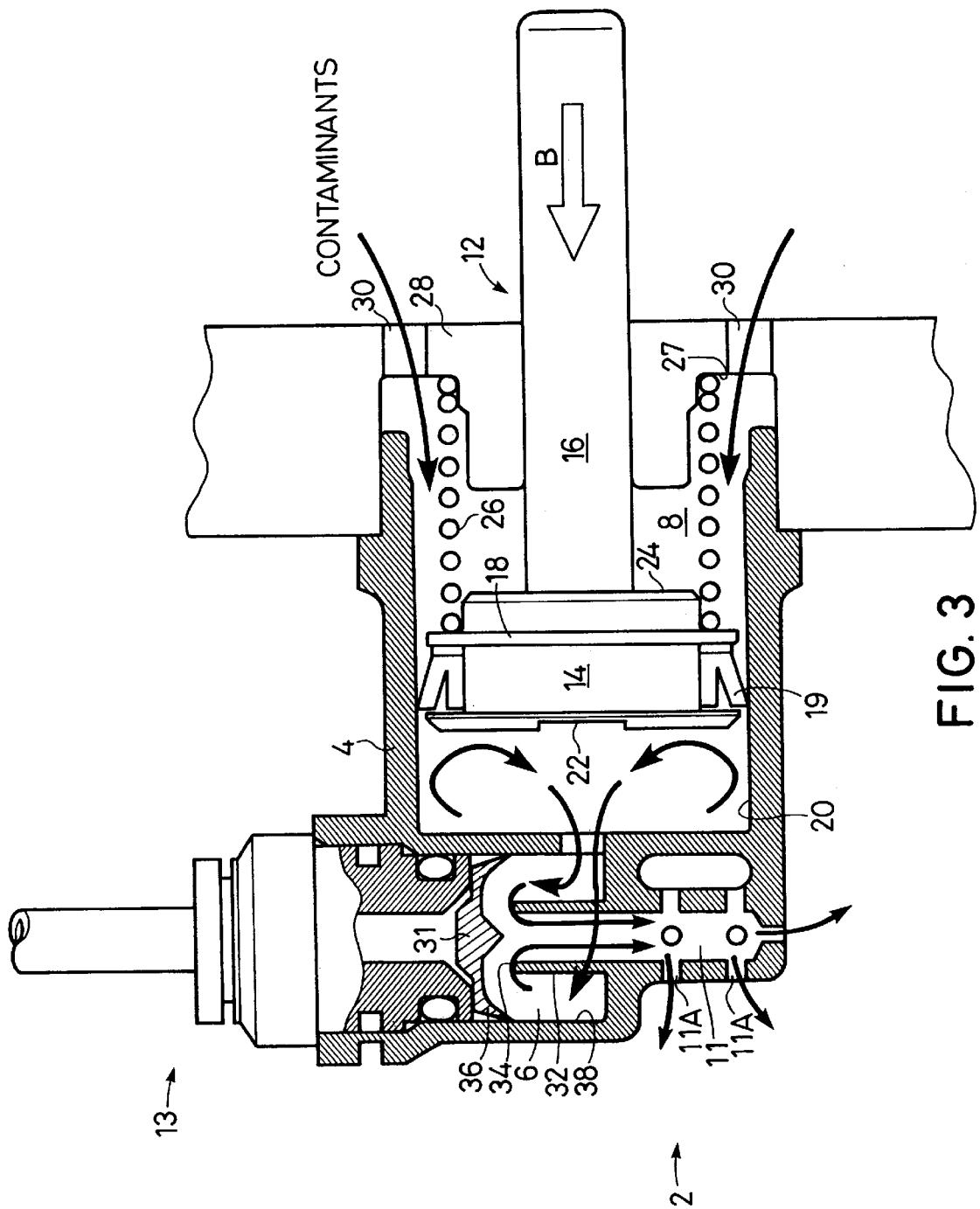
FIG. 3 is a cross-sectional view of the gas actuating device shown in FIG. 1 in a return mode.

Operation of gas actuating device 2 may be understood by referring to FIGS. 2 and 3. As shown in FIG. 2, when compressed gas is supplied to gas applying chamber 6 through gas conduit 13, the compressed gas presses against valve 31, thus sealing gas release intake opening 34 and preventing gas from entering gas release passage 11. At the same time, however, the compressed gas is allowed to pass between sealing lip 36 and side wall 38 because sealing lip 36 is inclined in the same direction as the pressure of the compressed gas. As a result of the structure of valve 31 and its interaction with the gas passages, the compressed gas passes through gas applying passage 10 into actuator chamber 8 at the first side 22 of piston 14 at a rapid speed, and actuating member 12 moves in the direction A against the force of spring 26. The gas in actuator chamber 8 on the second side 24 of piston 14 to escape to the outside of housing 4 through ambient gas passages 30.

As shown in FIG. 3, when compressed gas is no longer supplied through gas conduit 13, spring 26 causes actuating member 12 to move in the direction B at a rapid speed. This causes the gas in actuator chamber 8 on the first side 22 of piston 14 to pass back through gas applying passage 10 and into gas applying chamber 6. Since the gas pressure in gas applying chamber 6 is pressing in the opposite direction of the incline of sealing lip 36, the gas pressure moves seal 31 upwardly within gas applying chamber 6 so that valve 31 opens gas release intake opening 34. The gas then enters gas release passage 11 and exits housing 4 through exhaust openings 11A, again at a rapid speed. At the same time, a vacuum is formed in actuator chamber 8 at the second side 24 of piston 14, and ambient gas from outside housing 4 enters actuator chamber 8 through ambient gas passages 30.

Figure 4:
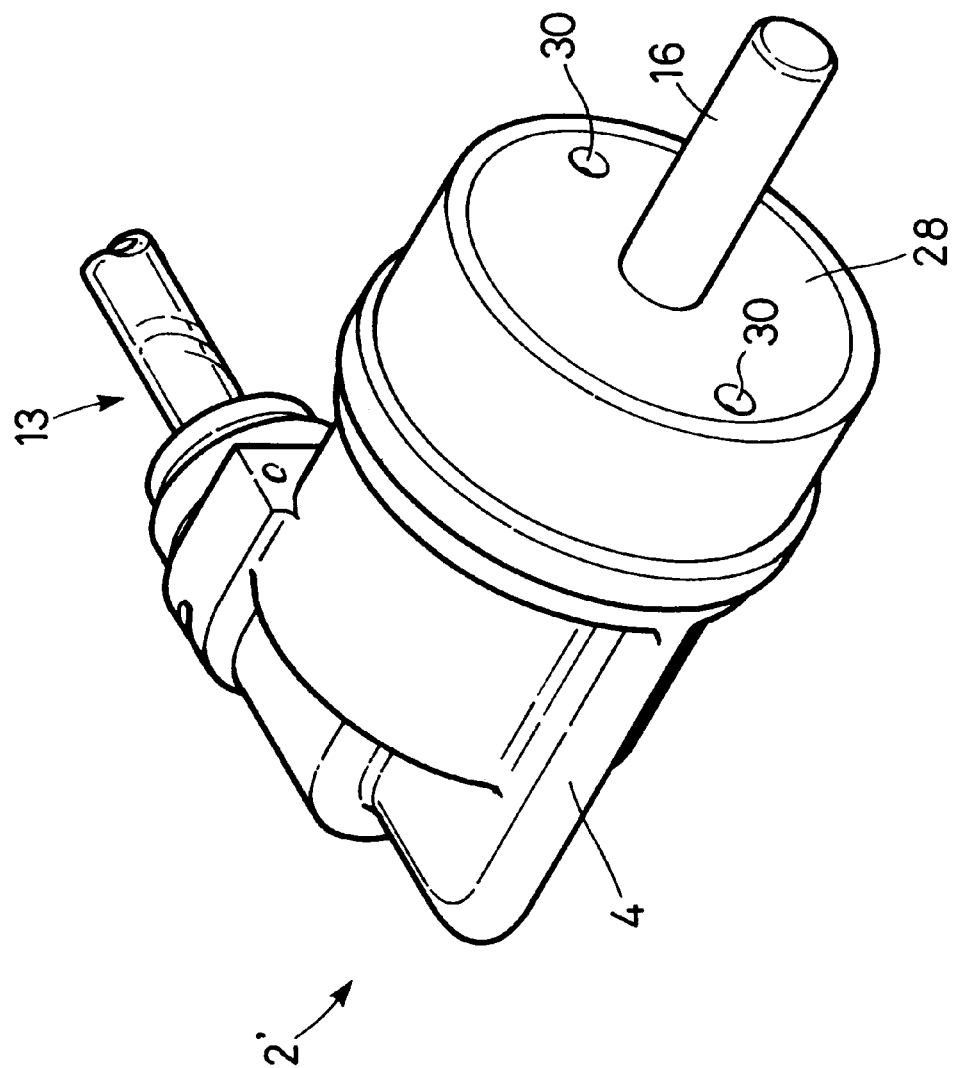
FIG. 4 is an oblique view of an alternative embodiment of a gas actuating device according to the present invention.
Figure 5:
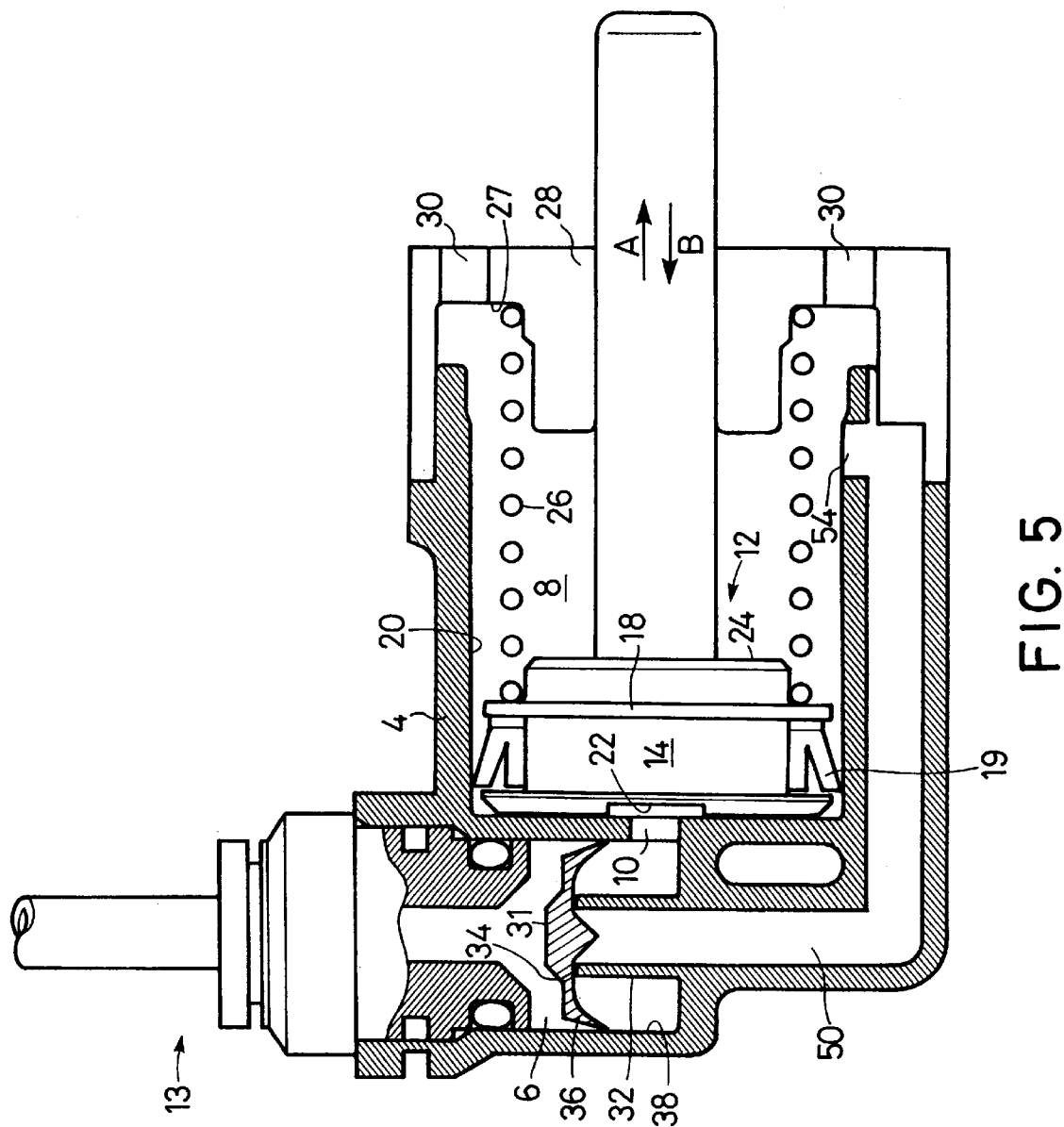
FIG. 5 is a cross-sectional view of the gas actuating device shown in FIG. 4.

FIG. 4 is an oblique view of another embodiment of a gas actuating device 2' according to the present invention, and FIG. 5 is a cross-sectional view of the gas actuating device 2' shown in FIG. 4. This embodiment is substantially the same as the gas actuating device 2 shown in FIGS. 1–3, so the same reference numbers will be used to identify identical components, and a detailed description of the common components will be omitted. The gas actuating device 2' shown in FIGS. 4 and 5 differs from the gas actuating device shown in FIGS. 1–3 in that exhaust openings 11A have been omitted, and gas release passage 11 has been replaced with a gas release passage 50 with a gas release opening 54 that communicates gas from gas applying chamber 6 to actuator chamber 8 at the second side 24 of piston 14.

Figure 6:
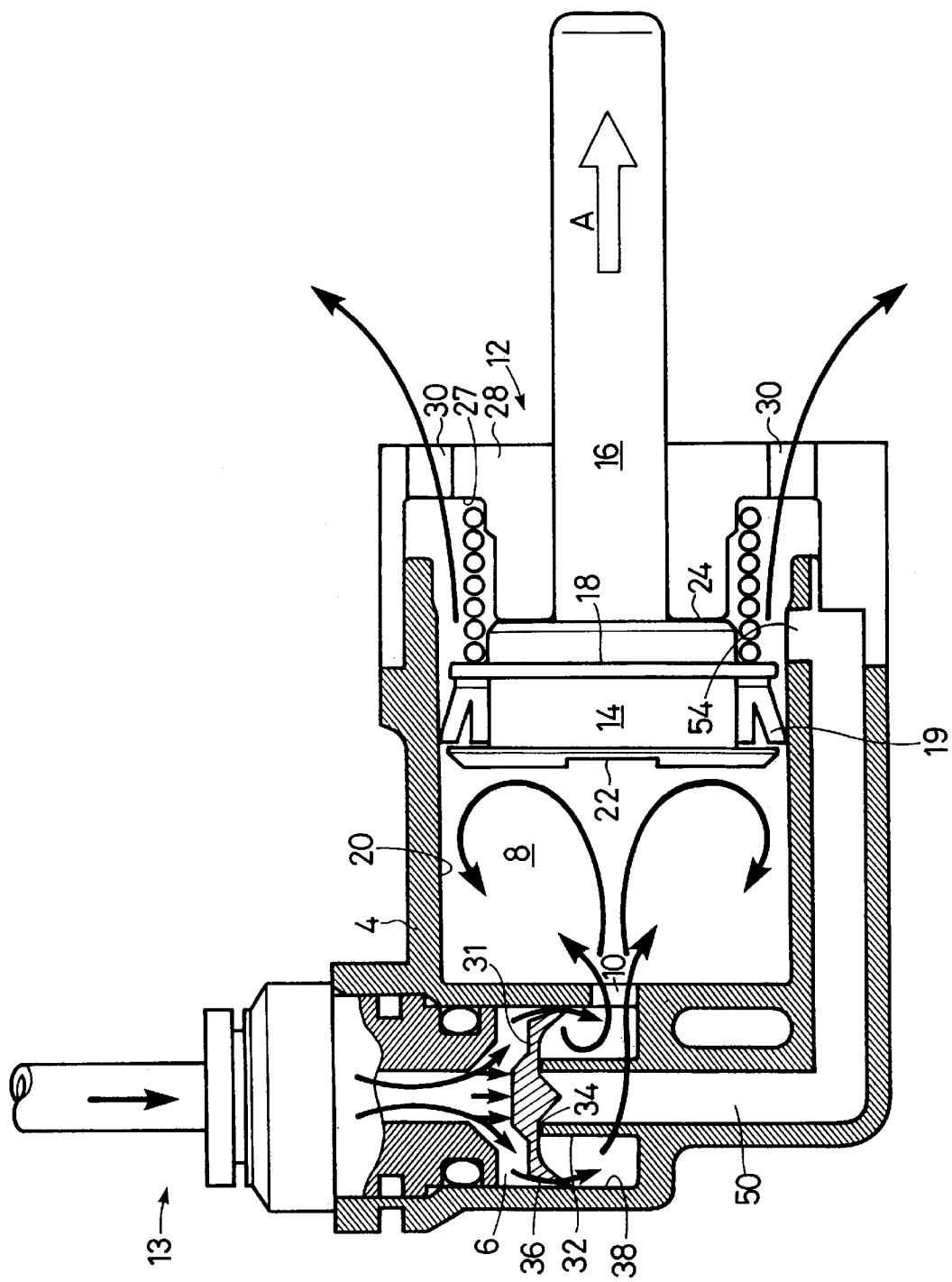
FIG. 6 is a cross-sectional view of the gas actuating device shown in FIG. 4 in an actuating mode.
Figure 7:
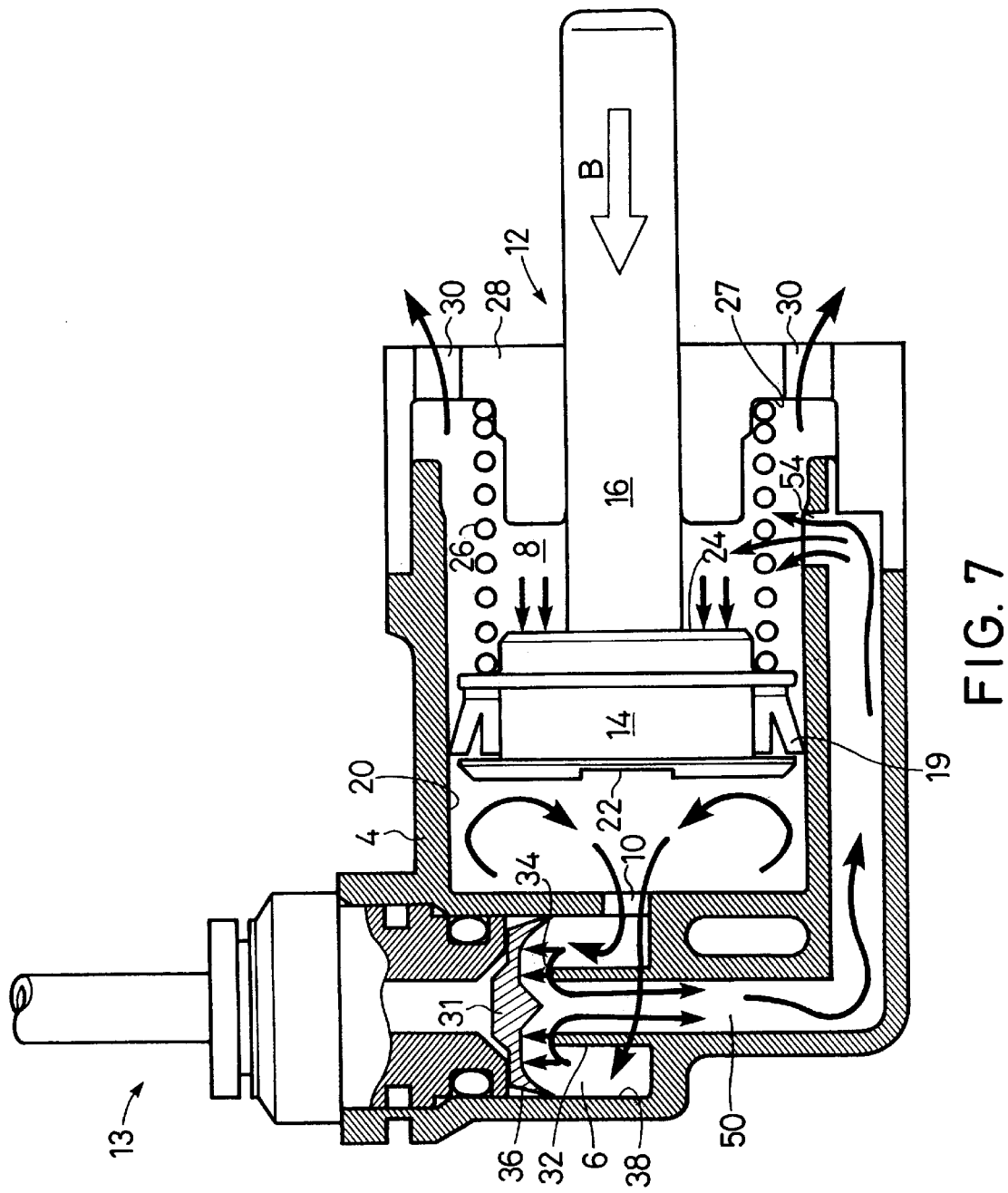
FIG. 7 is a cross-sectional view of the gas actuating device shown in FIG. 4 in a return mode.

Operation of gas actuating device 2' may be understood by referring to FIGS. 6 and 7. The operation when compressed gas is applied to gas applying chamber 6 is the same as described for gas actuating device 2 shown in FIG. 2. That is, as shown in FIG. 6, when compressed gas is supplied to gas applying chamber 6 through gas conduit 13, the compressed gas presses against valve 31, thus sealing gas release intake opening 34 and preventing gas from entering gas release passage 50. At the same time, however, the compressed gas is allowed to pass between sealing lip 36 and side wall 38 because sealing lip 36 is inclined in the same direction as the pressure of the compressed gas. As a result, the compressed gas passes through gas applying passage 10 into actuator chamber 8 at the first side 22 of piston 14, and actuating member 12 rapidly moves in the direction A against the force of spring 26. This causes the gas in actuator chamber 8 on the second side 24 of piston 14 to escape to the outside of housing 4 through ambient gas passages 30.

On the other hand, as shown in FIG. 7, when compressed gas is no longer supplied through gas conduit 13, spring 26 causes actuating member 12 to move in the direction B. This causes the gas in actuator chamber 8 on the first side 22 of piston 14 to pass back through gas applying passage 10 and into gas applying chamber 6. Since the gas pressure in gas applying chamber 6 is pressing in the opposite direction of the incline of sealing lip 36, the gas pressure moves seal 31 upwardly within gas applying chamber 6 so that valve 31 opens gas release intake opening 34. The gas then enters gas release passage 50 and is communicated to actuator chamber 8 at the second side of piston 14. In this case a vacuum is not formed in actuator chamber 8 at the second side of piston 14. In fact, since the volume of actuator chamber 8 (and the corresponding pressure) at the first side 22 of piston 14 when piston 14 is located in the position shown in FIG. 6 is greater than the volume of the actuator chamber 8 at the second side of piston 14 when piston 14 is located in the closed position shown in FIG. 5, a positive pressure will build up within actuator chamber 8 at the second side 24 of piston 14, and the gas communicated from actuator chamber 8 at the first side 22 of piston 14, back through gas applying passage 10, through gas applying chamber 6, through gas release passage 50 and into actuator chamber 8 at the second side 24 of piston 14 will blow out through ambient gas passages 30. This, in turn, prevents contaminants from entering ambient gas passages to adversely affect the operation of gas actuating device 2'. The positive pressure at the second side 24 of piston 14 also helps push piston 14 in the direction B in addition to the force applied by spring 26, so piston 14 closes even more rapidly than when pushed by spring 26 alone.

Figure 8:
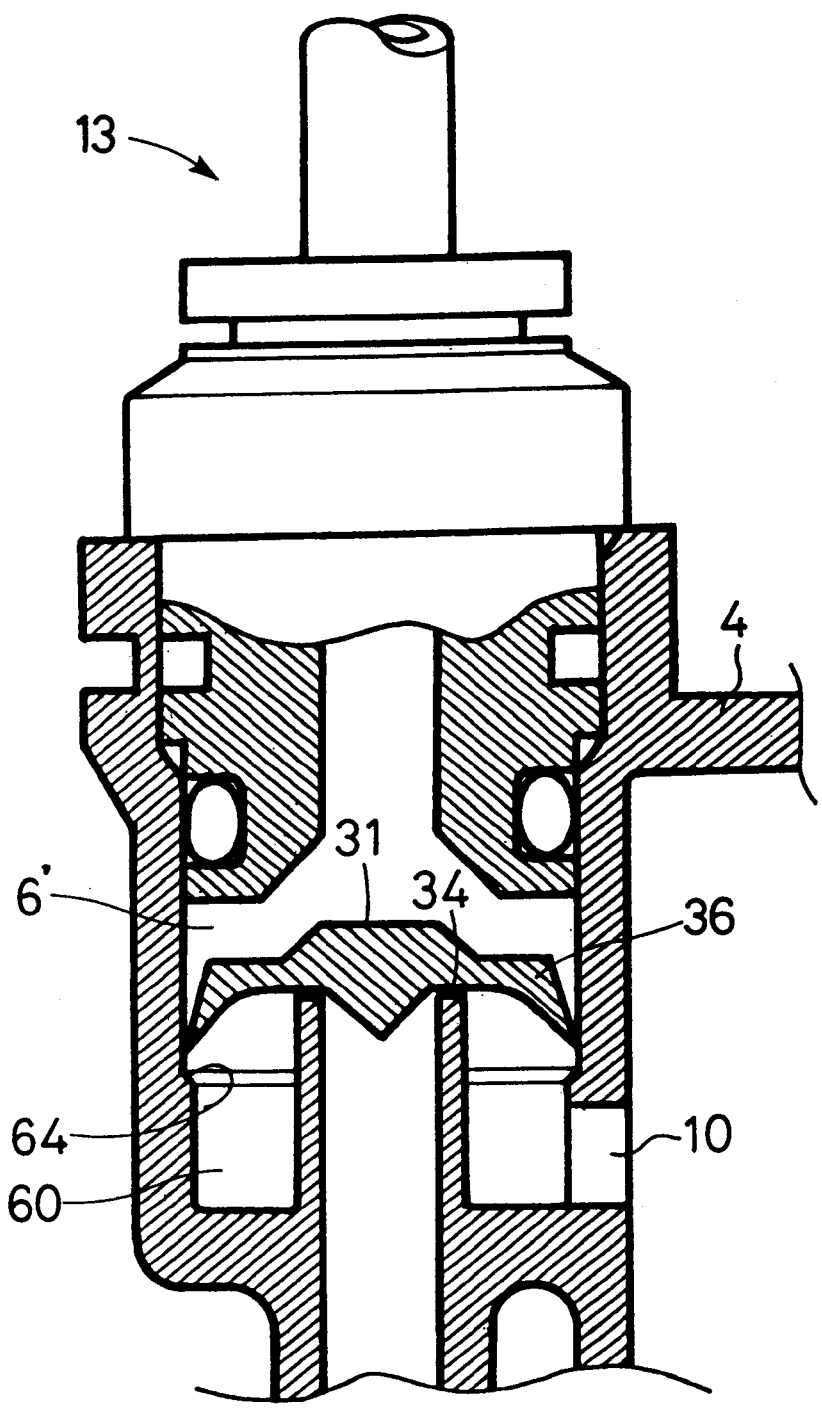
FIG. 8 is a cross-sectional view of an alternative embodiment of a gas applying chamber that may be used in the gas actuating device shown in FIG. 4.

FIG. 8 is a cross-sectional view of an alternative embodiment of a gas applying chamber 6' that may be used in the gas actuating devices shown in FIGS. 1–3 and 5–7. Since valve 31 moves vertically within gas applying chamber 6', some instability in the movement of valve 31 may result. Thus, in this embodiment gas applying chamber 6' is formed with a smaller diameter portion 60 which forms a shoulder 64 which prevents valve 31 from becoming excessively tilted during operation.

Figure 9:
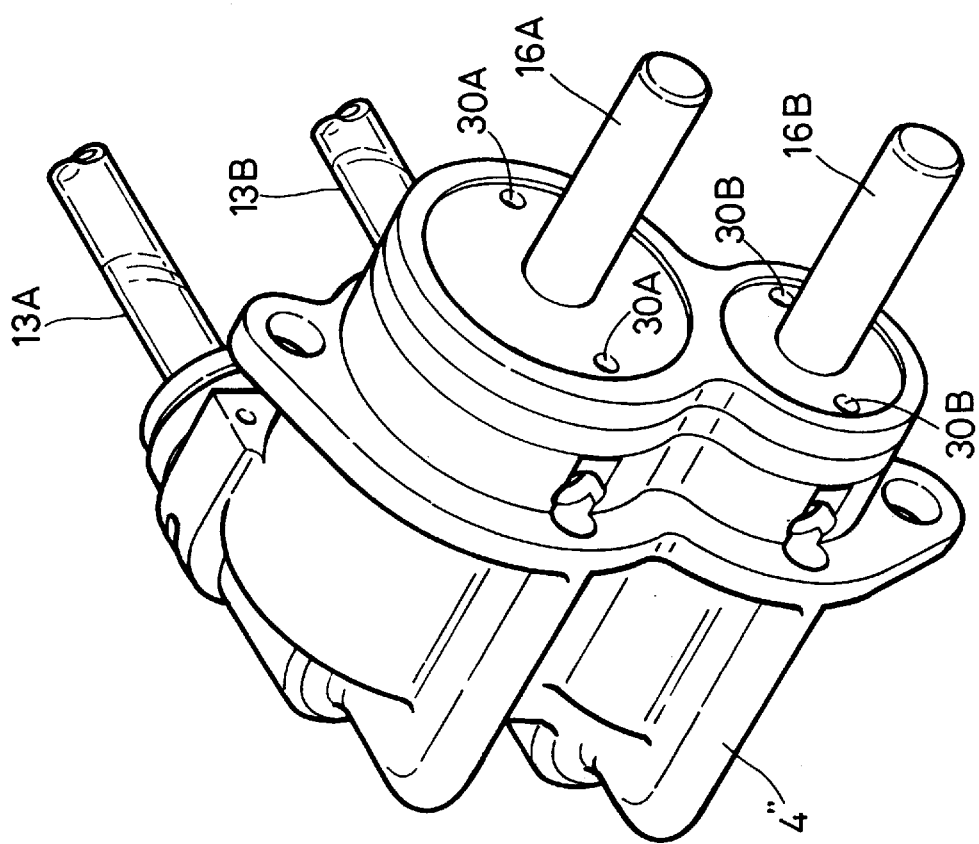
FIG. 9 is an oblique view of another alternative embodiment of a gas actuating device according to the present invention.

FIG. 9 is an oblique view of an alternative embodiment of a combination gas actuating device 2" according to the present invention. In this embodiment, housing 4" is constructed to house two gas separate actuating devices, each having the same construction as gas actuating device 2' shown in FIGS. 5–7. Thus, each gas actuating device has its own gas conduit 13(A) and 13(B), its own ambient gas passages 30(A) and 30(B), its own reciprocating member 16(A) and 16(B), and so on.

Figure 12:
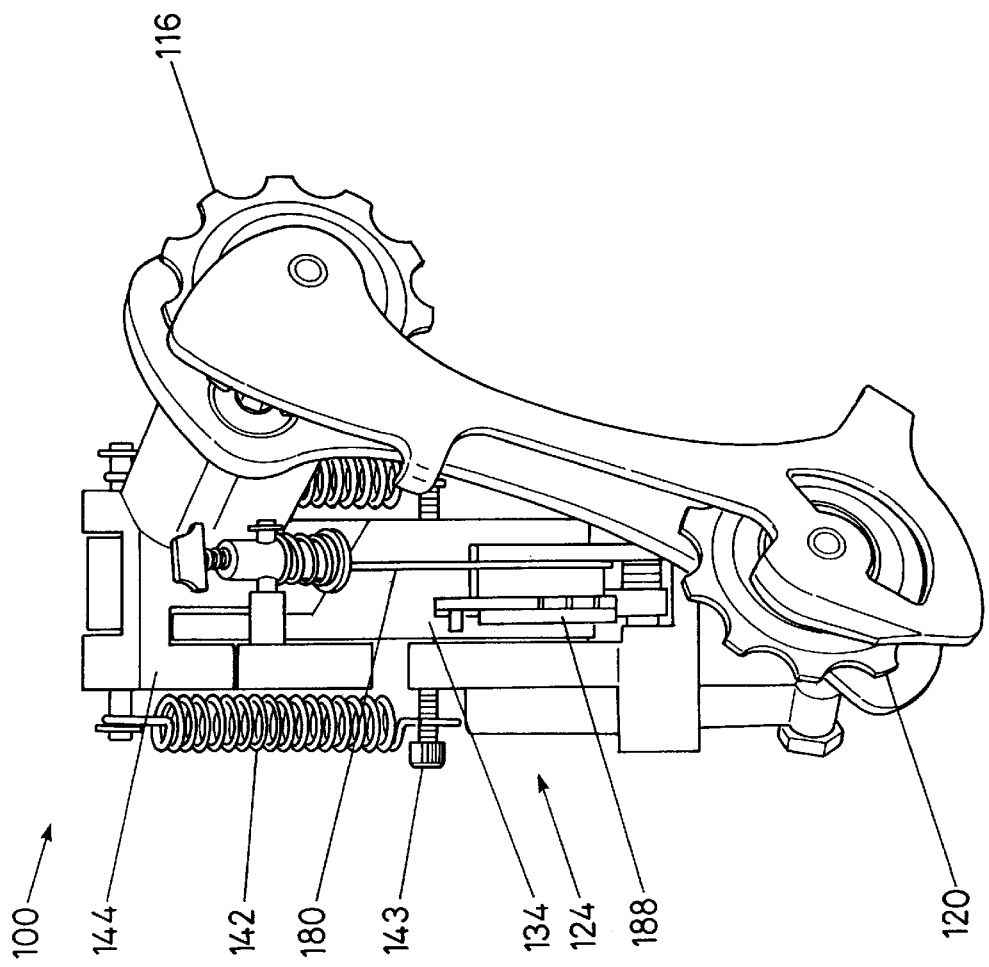
FIG. 12 is a bottom view of the gas actuated derailleur shown in FIG. 10.

FIGS. 10–12 are side, rear and bottom views, respectively, of an embodiment of a gas actuated shifting mechanism in the form of a rear derailleur 100 according to the present invention. Derailleur 100 includes a base member 104, a movable member 108 supporting a chain guide 112 having a guide pulley 116 and a tension pulley 120, a coupling mechanism 124 coupling the base member 104 to the movable member 108 so that the movable member 108 moves relative to the base member 104, and an actuation mechanism 130 responsive to compressed gas for causing the movable member 108 to move relative to the base member 104.

Coupling mechanism 124 comprises a first link member 134 (FIG. 12) pivotably coupled to the base member 104 through a pivot pin 101 (FIG. 13) and to the movable member 108 through a pivot pin 102, and a second link member 138 pivotably coupled to the base member 104 through a pivot pin 103 and bearings 230 (FIG. 14) and to the movable member 108 through a pivot pin 105. An actuating arm 137 extends approximately perpendicular to second link member 138, and a low-side adjustment screw 135 is mounted to second link 138. First link member 134 and second link member 138 form a four-bar type coupling mechanism with base member 104 and movable member 108. A first return spring 139 located on one side of link 138 has a first end 140 coupled to the base member 104 and a second end 141 coupled to movable member 108, and a second return spring 142 located on the opposite side of link 138 has a first end 143 coupled to the base member 104 and a second end 144 coupled to the movable member 108. Return springs 139 and 142 bias movable member 108 in the upshifting direction, typically laterally outwardly from the rear wheel of the bicycle.

Figure 13:
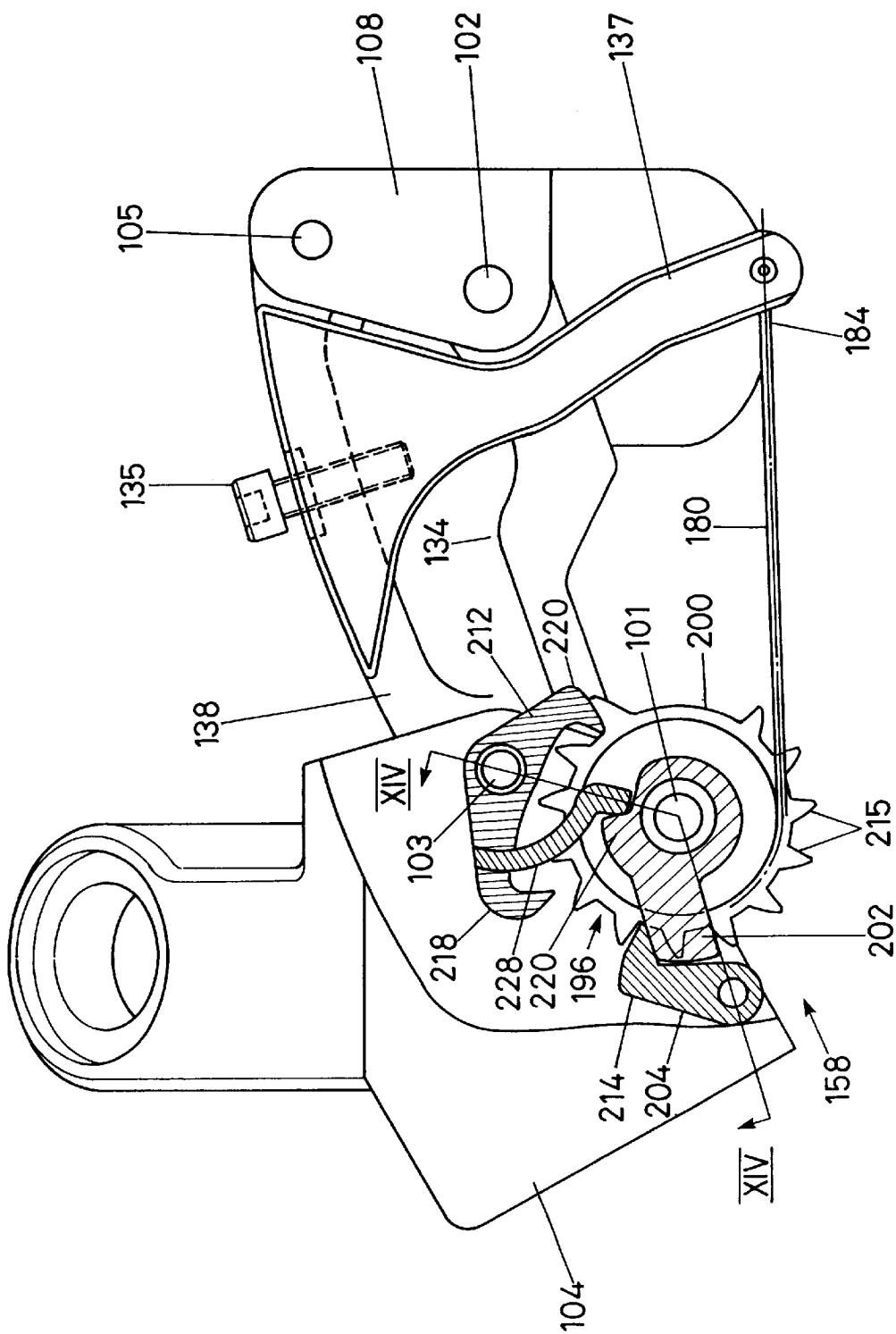
FIG. 13 is a partial cut away view of the gas actuated derailleur shown in FIG. 10 illustrating a particular embodiment of an indexing mechanism.

Actuation mechanism 130 includes an upshift gas actuator 150, a downshift gas actuator 154, and an indexing mechanism 158 (FIG. 13). The combined upshift gas actuator 150 and downshift gas actuator 154 has the structure of gas actuating device 2" shown in FIG. 9. Upshift gas actuator 150 includes a first reciprocating element 162 (FIG. 16A) which reciprocates in response to successive application and removal of gas pressure. More specifically, when compressed gas is supplied to upshift gas actuator 150, reciprocating element 162 moves forward a specific stroke. When the compressed gas pressure is removed, reciprocating element 162 returns to its starting position. When actuated, upshift gas actuator 150 causes the movable member 108 to move in the upshifting direction relative to the base member 104. Similarly, downshift gas actuator 154 includes a second reciprocating element 166 (FIG. 15A) which reciprocates in response to successive application and removal of gas pressure. When compressed gas is supplied to downshift gas actuator 154, reciprocating element 166 moves forward a specific stroke. When the compressed gas pressure is removed, reciprocating element 166 returns to its starting position. When actuated, downshift gas actuator 154 causes the movable member 108 to move in the downshifting direction relative to the base member 104.

Figure 14:
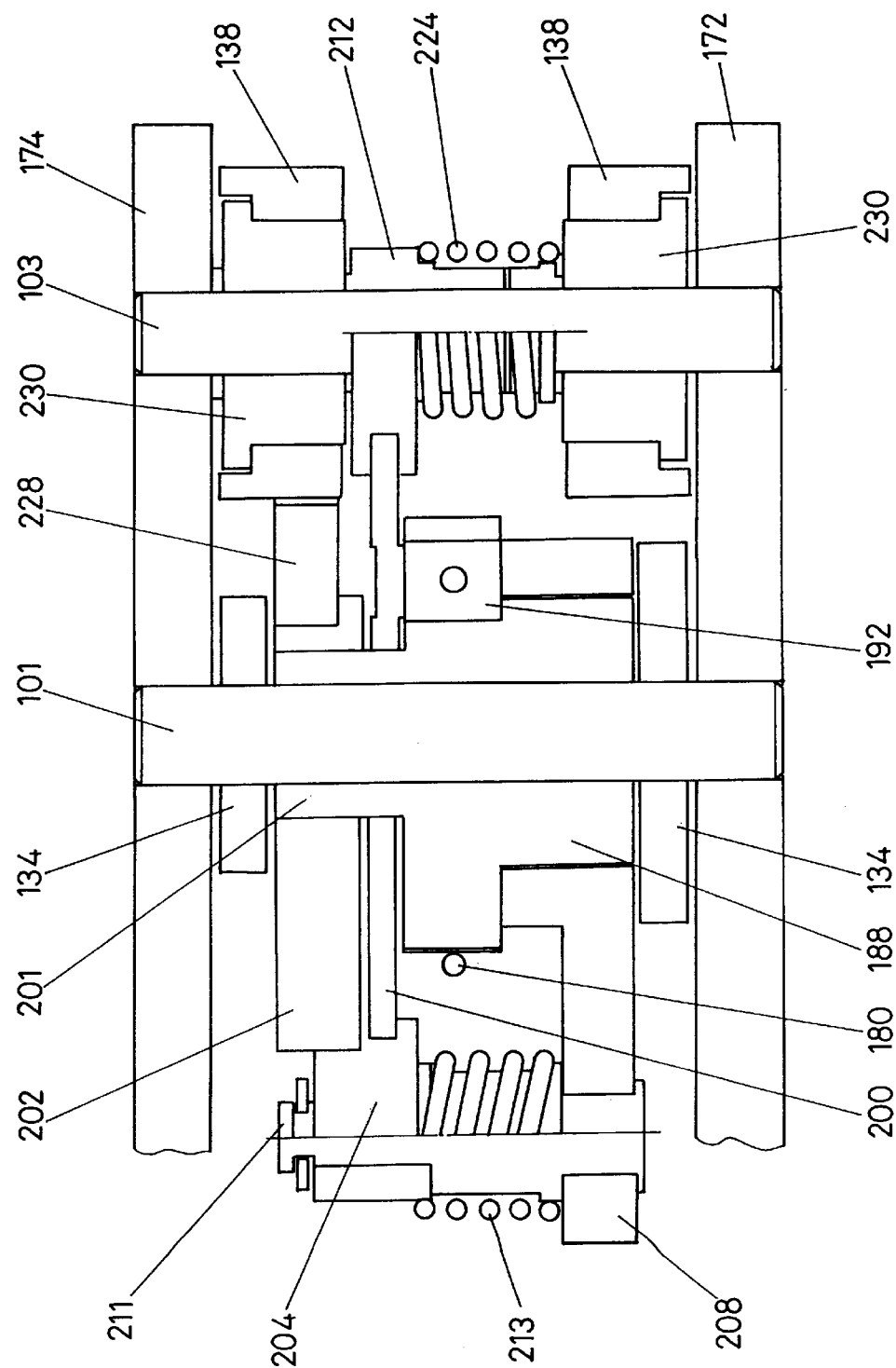
FIG. 14 is a view taken along line XIV—XIV in FIG. 13.

Indexing mechanism 158 is coupled to upshift gas actuator 150, to downshift gas actuator 154 and to coupling mechanism 124 for setting and maintaining movable member 108 in a plurality of positions relative to the sprockets mounted to the rear wheel (not shown). Indexing mechanism 158 is fitted within base member 104 between base member bracket members 172 and 174 (FIG. 14) to reduce the overall size of derailleur 100. More specifically, as shown in FIGS. 13 and 14, indexing mechanism 158 includes a control element 180 in the form of a cable having a first end 184 coupled to coupling mechanism 124 via actuating arm 137, a takeup element 188 in the form of a winding drum rotatably mounted around pivot pin 101 for pulling and releasing a second end 192 of the control element 180, and a ratchet and pawl mechanism 196 coupled to the takeup element 188, to the upshift gas actuator 150 and to the downshift gas actuator 154 for moving takeup element 188 to a selected position and for maintaining takeup element 188 in the selected position.

To prevent undesirable bending forces which tend to wear out the link pivot shafts and decrease efficiency, control element 180 in this embodiment approximately aligns with a centerline of the link 134. This feature, together with the two return springs 139 and 142, balance the return spring force among the components. Depending upon the derailleur design, the return springs 139 and 142 may have different spring constants to fine tune the balanced forces on the derailleur components. Of course, it is possible to use only one return spring if desired for some applications.

Ratchet and pawl mechanism 196 includes a toothed ratchet wheel 200, a release cam 202, a drive pawl 204, and a positioning pawl 212. Ratchet wheel 200 is mounted around a shaft 201 of takeup element 188 for integral rotation with takeup element 188. The spacing between each ratchet tooth 215 is set so that each ratchet tooth corresponds to one sprocket position. Release cam 202 is coupled to reciprocating element 162 of upshifting gas actuator 150 through a release cam arm 203 (FIG. 16A), and it is further mounted around shaft 201 of takeup element 188 such that release cam 202 is capable of rotation relative to takeup element 188. Drive pawl 204 is coupled to reciprocating element 166 of downshift gas actuator 154 through a drive pawl arm 208 (FIG. 15A) for driving ratchet wheel 200 to the selected position. Drive pawl 204 is rotatably mounted around a pawl shaft 211 which, in turn, is mounted to drive pawl arm 208. A pawl spring 213 is mounted between drive pawl 204 and drive pawl arm 208 for biasing drive pawl 204 so that a drive pawl tooth 214 engages with one of the ratchet teeth 215 of ratchet wheel 200. Positioning pawl 212 is rotatably mounted around pivot pin 103 for selectively maintaining ratchet wheel 200 in the selected position and releasing ratchet wheel 200 from the selected position. Positioning pawl 212 includes pawl teeth 218 and 220. A pawl spring 224 is mounted between positioning pawl 212 and link 138 for biasing positioning pawl 212 clockwise in FIG. 16. Positioning pawl 212 also includes a cam follower arm 228 which engages a cam surface 220 of release cam 202. The function of cam follower arm 228 is discussed below.

FIGS. 15B–15E illustrate the operation of indexing mechanism 158 during a downshifting operation. Initially, ratchet wheel 200 is held in position by the engagement of pawl tooth 220 of positioning pawl 212 with a ratchet tooth 215A. When compressed gas is applied to downshift gas actuator 154, reciprocating element 166 (FIG. 15A) moves to the right which, in turn, causes drive pawl arm 208 to rotate in a clockwise direction. Pawl tooth 214 of drive pawl 204 then presses against a ratchet tooth 215B of ratchet wheel 200 and rotates ratchet wheel 200 clockwise. This, in turn, causes control element 180 to wrap around takeup element 188 so that control element 180 pulls on actuating arm 137 and causes movable member 108 to move in a downshifting direction.

As ratchet wheel 200 rotates, a ratchet tooth 215C presses against pawl tooth 220 of positioning pawl 212 and causes positioning pawl 212 to move counterclockwise as shown in FIG. 15B. As ratchet wheel 200 continues to rotate clockwise, pawl tooth 220 of positioning pawl 212 rides over the tip of ratchet tooth 215C and falls into the recess to the left of ratchet tooth 215C as shown in FIG. 15C. When the compressed gas is removed from downshift gas actuator 154, reciprocating element 166 moves to the left, thus causing drive pawl 204 to move counterclockwise as shown in FIG. 15D. Ratchet wheel 200 does not rotate counterclockwise at this time because it is held in place by the engagement of pawl tooth 220 and ratchet tooth 215C. As a result, drive pawl tooth 214 rides over the tip of a ratchet tooth 215D and falls into the recess to the left of ratchet tooth 215D. Drive pawl 204 now is located in its home position, and a downshift by one sprocket position is completed.

FIGS. 16B–16E illustrate the operation of indexing mechanism 158 during an upshifting operation. Once again, assume ratchet wheel 200 initially is held in position by the engagement of pawl tooth 220 of positioning pawl 212 with ratchet tooth 215A. When compressed gas is applied to upshift gas actuator 150, reciprocating element 162 (FIG. 16A) moves to the right which, in turn, causes release cam arm 203 to rotate in a clockwise direction. Since release cam arm 203 is coupled to release cam 202, release cam 202 rotates clockwise. As shown more clearly in FIG. 16B, clockwise rotation of release cam 202 causes a cam face 250 of release cam 202 to press against pawl tooth 214 of drive pawl 204 to rotate drive pawl 204 counterclockwise and prevent pawl tooth 214 from engaging any ratchet tooth 215. At the same time, cam face 220 of release cam 202 presses against cam follower arm 228 which, in turn, causes positioning pawl 212 to rotate counterclockwise. Pawl tooth 220 then rides up the side of ratchet tooth 215A, and pawl tooth 218 enters the valley between pawl teeth 215E and 215F. Further clockwise rotation of release cam 202 causes further counterclockwise rotation of positioning pawl 212 until pawl tooth 220 clears the tip of ratchet tooth 215A and pawl tooth 218 is located at the bottom of the valley between ratchet teeth 215E and 215F as shown in FIG. 16C. When pawl tooth 220 clears the tip of ratchet tooth 215A, ratchet wheel 200 immediately begins to rotate counterclockwise as a result of the bias of return springs 139 and 142, thus unwinding control element 180 from takeup element 188. Rotation of ratchet wheel 200 stops when ratchet tooth 215F contacts pawl tooth 218 as shown in FIG. 16D. When the compressed gas is removed from upshift gas actuator 150, reciprocating element 162 moves to the left, thus causing release cam 202 to move counterclockwise as shown in FIG. 16E. As a result, cam face 250 of release cam 202 allows pawl tooth 214 of drive pawl to return to its home position. Additionally, cam face 220 of release cam 202 allows positioning pawl 212 to rotate clockwise as a result of the bias of pawl spring 224. Pawl tooth 218 then rides up the side of ratchet tooth 215F, and pawl tooth 220 simultaneously enters the valley between ratchet teeth 215A and 215G. When pawl tooth 218 clears the tip of ratchet tooth 215F, ratchet wheel 200 again begins to rotate counterclockwise as a result of the bias of pawl spring 224, further unwinding control element 180 from takeup element 188 until pawl tooth 220 contacts the side of ratchet tooth 215G. Ratchet wheel 200, and hence takeup element 188, are maintained in this position by the engagement of pawl tooth 220 and ratchet tooth 215G, thus completing the upshifting operation.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A gas actuating device comprising:

a housing having a gas applying chamber, an actuator chamber and a gas applying passage for communicating gas from the gas applying chamber to the actuator chamber;

an actuating member disposed in the actuator chamber and having a first side and a second side, wherein the first side of the actuating member receives gas pressure from gas applied to the actuating chamber from the gas applying passage, and wherein the actuating member moves in a first direction in response to the gas pressure applied to the first side of the actuating member;

an unbiased valve for selectively communicating compressed gas from the gas applying chamber to the actuator chamber through the gas applying passage for moving the actuating member in the first direction; and a gas release passage for communicating gas from the actuator chamber at the first side of the actuating member to an outside of the actuator chamber.

2. A gas actuating device comprising:

a housing having a gas applying chamber, an actuator chamber and a gas applying passage for communicating gas from the gas applying chamber to the actuator chamber;

an actuating member disposed in the actuator chamber and having a first side and a second side, wherein the first side of the actuating member receives gas pressure from gas applied to the actuating chamber from the gas applying passage, and wherein the actuating member moves in a first direction in response to the gas pressure applied to the first side of the actuating member;

a valve for selectively communicating compressed gas from the gas applying chamber to the actuator chamber through the gas applying passage for moving the actuating member in the first direction;

a gas release passage for communicating gas from the actuator chamber at the first side of the actuating member to an outside of the actuator chamber; and wherein the gas release passage communicates gas from the actuator chamber at the first side of the actuating member through the gas applying chamber to an outside of the gas applying chamber without returning the gas to the actuator chamber at the second side of the actuating member.

3. The device according to claim 1 wherein the gas release passage communicates gas from the actuator chamber at the first side of the actuating member through the gas applying chamber to the actuator chamber at the second side of the actuating member and to the outside of the actuator chamber.

4. A gas actuating device comprising:
   a housing having a gas applying chamber, an actuator chamber and a gas applying passage for communicating gas from the gas applying chamber to the actuator chamber;
   an actuating member disposed in the actuator chamber and having a first side and a second side, wherein the first side of the actuating member receives gas pressure from gas applied to the actuating chamber from the gas applying passage, and wherein the actuating member moves in a first direction in response to the gas pressure applied to the first side of the actuating member;
   an unbiased valve for selectively communicating compressed gas from the gas applying chamber to the actuator chamber through the gas applying passage for moving the actuating member in the first direction; and
   wherein the housing includes a gas release passage for communicating gas from the actuator chamber at the first side of the actuating member to the actuator chamber at the second side of the actuating member.

5. The device according to claim 4 wherein the housing further includes a ambient gas passage for communicating gas between the actuator chamber at the second side of the actuating member and the outside the housing.

6. The device according to claim 4 wherein the actuating member is sealingly disposed in the actuator chamber.

7. The device according to claim 4 further comprising a biasing mechanism for biasing the actuating member in a second direction different from the first direction.

8. The device according to claim 7 wherein the first direction is opposite the second direction.

9. The device according to claim 4 wherein the valve seals the gas release passage when compressed gas is applied to the gas applying chamber, and wherein the valve allows the compressed gas applied to the gas applying chamber to be communicated to the actuator chamber through the gas applying passage.

10. The device according to claim 9 wherein the gas release passage originates at the gas applying chamber.

11. The device according to claim 10 wherein the valve allows gas to be communicated from the actuator chamber, through the gas applying passage and through the gas release passage when compressed gas is not applied to the gas applying chamber.

12. The device according to claim 11 wherein the valve is disposed in the gas applying chamber, wherein the valve is located in a first position within the gas applying chamber when compressed gas is applied to the gas applying chamber, and wherein the valve is located in a second position when gas is being communicated from the actuator chamber through the gas applying passage and through the gas release passage.

13. The device according to claim 12 wherein the gas release passage includes a gas release passage side wall that extends into the gas applying chamber and terminates in a gas release intake opening, and wherein the valve is sealingly disposed on the gas release intake opening when compressed gas is supplied to the gas applying chamber.

14. The device according to claim 13 wherein the valve includes a sealing lip that sealingly engages a gas applying chamber side wall.

15. The device according to claim 14 wherein the gas applying chamber defines a step for stabilizing the valve as the valve moves within the gas applying chamber.

16. The device according to claim 14 wherein the sealing lip allows gas to pass by it when compressed gas is supplied to the gas applying chamber.

17. The device according to claim 16 wherein the sealing lip prevents gas from passing by it when gas is being communicated from the actuator chamber through the gas applying passage and through the gas release passage.

18. The device according to claim 4 wherein the actuating member comprises a piston having an reciprocating member attached thereto, wherein the piston sealingly engages the actuating chamber.

19. The device according to claim 18 wherein the biasing mechanism comprises a spring disposed on the second side of the actuating member.

20. The device according to claim 19 wherein the first side of the actuating member from the second actuator chamber at the first side of the second actuating member to the second actuator chamber at the second side of the second actuating member.

21. A gas actuating device comprising:
   a housing including:
      a first gas applying chamber;
      a first actuator chamber;
      a first gas applying passage for communicating gas from the first gas applying chamber to the first actuator chamber;
      a second gas applying chamber;
      a second actuator chamber;
      a second gas applying passage for communicating gas from the second gas applying chamber to the second actuator chamber;
   a first actuating member disposed in the first actuator chamber and having a first side and a second side, wherein the first side of the first actuating member receives gas pressure from gas applied to the first actuating chamber from the first gas applying passage, and wherein the first actuating member moves in a first direction in response to the gas pressure applied to the first side of the first actuating member;
   a first valve for selectively communicating compressed gas from the first gas applying chamber to the first actuator chamber through the first gas applying passage for moving the first actuating member in the first direction;
   a second actuating member disposed in the second actuator chamber and having a first side and a second side, wherein the first side of the second actuating member receives gas pressure from gas applied to the second actuating chamber from the second gas applying passage, and wherein the second actuating member moves in a second direction in response to the gas pressure applied to the first side of the second actuating member;
   a second valve for selectively communicating compressed gas from the second gas applying chamber to the second actuator chamber through the second gas applying passage for moving the second actuating member in the second direction;
   wherein at least one of the first valve and the second valve is unbiased;

wherein the housing includes a first gas release passage for communicating gas from the first actuator chamber at the first side of the first actuating member to the first actuator chamber at the second side of the first actuating member; and wherein the housing includes a second gas release passage for communicating gas from the second actuator chamber at the first side of the second actuating member to the second actuator chamber at the second side of the second actuating member.

22. A gas actuated derailleur for a bicycle comprising:

a base member;

a movable member supporting a chain guide;

a coupling mechanism coupling the base member to the movable member so that the movable member moves relative to the base member;

a biasing mechanism for biasing the movable member in a first direction relative to the base member;

a gas actuating device for causing the movable member to move relative to the base member, wherein the gas actuating device comprises:

a housing having a first gas applying chamber, a first actuator chamber and a first gas applying passage for communicating gas from the first gas applying chamber to the first actuator chamber;

a first actuating member disposed in the first actuator chamber and having a first side and a second side, wherein the first side of the first actuating member receives gas pressure from gas applied to the first actuating chamber from the first gas applying passage, and wherein the first actuating member moves in a first direction in response to the gas pressure applied to the first side of the first actuating member;

a first valve for selectively communicating compressed gas from the first gas applying chamber to the first actuator chamber through the first gas applying passage for moving the first actuating member in the first direction; and wherein the housing includes a first gas release passage for communicating gas from the first actuator chamber at the first side of the first actuating member to the first actuator chamber at the second side of the first actuating member.

23. The derailleur according to claim 21 wherein the housing further includes a second gas applying chamber, a second actuator chamber and a second gas applying passage for communicating gas from the second gas applying chamber to the second actuator chamber, and wherein the gas actuating device further comprises:

a second actuating member disposed in the second actuator chamber and having a first side and a second side, wherein the first side of the second actuating member receives gas pressure from gas applied to the second actuating chamber from the second gas applying passage, and wherein the second actuating member moves in a second direction in response to the gas pressure applied to the first side of the second actuating member;

a second valve for selectively communicating compressed gas from the second gas applying chamber to the second actuator chamber through the second gas applying passage for moving the second actuating member in the second direction; and wherein the housing includes a second gas release passage for communicating gas from the second actuator chamber at the first side of the second actuating member to the second actuator chamber at the second side of the second actuating member.

24. The device according to claim 2 wherein the valve is unbiased.

* * * * *